(12) United States Patent
Trowbridge et al.

(10) Patent No.: US 7,184,939 B1
(45) Date of Patent: Feb. 27, 2007

(54) SYSTEM AND METHOD OF IMPLEMENTING USER ACTION MONITORING TO AUTOMATICALLY POPULATE OBJECT LAUNCHERS

(75) Inventors: Jon Eric Trowbridge, Chicago, IL (US); Nathaniel Dourif Friedman, Boston, MA (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 11/195,754

(22) Filed: Aug. 3, 2005

(51) Int. Cl.
  *G05B 19/04* (2006.01)
(52) U.S. Cl. ............... 702/193; 382/181; 715/764; 707/6
(58) Field of Classification Search ............... 702/193; 700/17, 83, 11, 56, 86; 382/181, 190, 209; 715/764, 810, 840–841; 707/4–7
See application file for complete search history.

(56) References Cited

U.S. PATENT DOCUMENTS

| | | | |
|---|---|---|---|
| 6,081,750 A * | 6/2000 | Hoffberg et al. | 700/17 |
| 6,400,996 B1 * | 6/2002 | Hoffberg et al. | 700/83 |
| 2002/0087649 A1 * | 7/2002 | Horvitz | 709/207 |
| 2004/0030753 A1 * | 2/2004 | Horvitz | 709/206 |

* cited by examiner

*Primary Examiner*—John Barlow
*Assistant Examiner*—Hien Vo
(74) *Attorney, Agent, or Firm*—Pillsbury Winthrop Shaw Pittman, LLP

(57) ABSTRACT

The invention is directed to a system and method of observing actions performed on a computer and inferring relationships between objects based on information corresponding to the observed actions. Relationships between the objects may be determined based on usage information and a usage pattern may be generated if the usage information recurs a selected number of times in a predetermined period of time. When a usage pattern is generated, objects may be automatically launched, icons may be automatically presented to users, and/or menu bars may be automatically configured based on established profiles.

20 Claims, 5 Drawing Sheets

SYSTEM AND METHOD OF IMPLEMENTING USER ACTION MONITORING TO AUTOMATICALLY POPULATE OBJECT LAUNCHERS

BACKGROUND

1. Field of the Invention

This invention relates to a system and method of observing actions performed on a computer and processing information that corresponds to the observed actions. In particular, the invention is directed to inferring relationships between objects based on information corresponding to the observed actions. More particularly, the invention is directed to automatically populating object launchers based on the inferred relationships between objects.

2. Background Information

During the course of a computer session, many actions may be performed on a computer. For several reasons, including increasing workforce productivity, it may be desirable to monitor these actions. Known applications enable monitoring of actions performed on the computer through logging of events, such as keystrokes, web sites visited, emails sent/received, windows viewed, and passwords entered. Known applications further enable capturing of screen shots at scheduled time intervals. Known event monitoring applications are typically run in stealth mode to make them undetectable to users of the monitored computer.

Other known applications enable monitoring of actions performed on the computer through direct monitoring of select types of object-level actions performed using a single application or through direct monitoring of select types of object-level actions performed in a suite of associated applications. Once the select types of object-level actions are logged, they may be displayed.

While known applications present logged events and/or selected types of object-level actions, known applications are deficient at least because they do not monitor and log all types of object-level actions performed across multiple unrelated applications. Additionally, known applications are deficient because they do not identify relationships between the events and/or selected types of object-level actions. For example, known applications do not analyze information associated with each event and/or selected type of object-level action to infer relationships between two or more events and/or two or more objects. Furthermore, known applications do not analyze the relationships to generate usage patterns for automatically launching events and/or object-level actions that coincide with the known usage patterns.

Other drawbacks exist with these and other known applications.

SUMMARY

Various aspects of the invention overcome at least some of these and other drawbacks of known applications. According to one embodiment of the invention, a system is provided that includes at least one client terminal having a processor, a memory, a display and at least one input mechanism (e.g., keyboard or other input mechanism). The client terminal may be connected or connectable to other client terminals via wired, wireless, and/or a combination of wired and wireless connections and/or to servers via wired, wireless, and/or a combination of wired and wireless connections.

Each client terminal preferably includes, or may be modified to include, monitoring software described herein that operates in the background to observe all types of actions performed on the corresponding client terminal. The actions may be associated with objects, including applications, documents, files, email messages, chat sessions, web sites, address book entries, calendar entries or other objects. The objects may include information, such as personal information, user data, and other information. Other applications may reside on the client terminal as desired.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to another embodiment of the invention, computer initiated actions may be tracked using triggering events. The type of information that corresponds to computer initiated actions may include, for example, when objects are automatically opened and/or closed, when the screen saver is activated, when an auto save is activated, and other computer initiated action information.

The information corresponding to user initiated actions and computer initiated actions may be displayed according to various configurations. For example, information corresponding to user initiated actions and computer initiated actions may be organized and displayed in a timeline. In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. According to one embodiment of the invention, information corresponding to the user initiated actions and/or the computer initiated actions may be presented as graphical information through screenshots, charts, and/or other graphical information. According to another embodiment of the invention, information corresponding to the user initiated actions and/or the computer initiated actions may be displayed in a linear format, non-linear format or other format.

According to one embodiment of the invention, a correlation determining system is provided that analyzes information associated with the user initiated actions that relate to these objects. Relationships may be inferred between objects based on a chronological proximity of user initiated actions, a chronological proximity of window focus toggling, or other information. Once relationships are discovered between two or more objects, the strength of the relationships may be determined using a relevance ranking that is based on a variety of factors associated with the user initiated actions and the computer initiated actions. A relationship between objects may be identified if the strength of the relationship is determined to exceed a predefined threshold value.

According to another embodiment of the invention, information corresponding to user initiated actions and computer initiated actions may be analyzed to determine a usage pattern. Patterns for objects may be identified based on usage information including, for example, a time of day the actions are performed, locations (e.g., home, work, and other locations) that the actions are performed, and other usage information.

Once patterns for selected objects are identified, a comparison may be performed between (1) the number of times selected parameters in the usage information for the identified objects recur, over a predetermined period of time, and (2) the usage pattern threshold value. A usage pattern may be generated if the usage information recurs more than the usage pattern threshold value over a predetermined period of time.

Based on the usage pattern, an automatic function may be performed. For example, objects may be automatically launched to coincide with the usage pattern. Alternatively, based on the usage pattern, users may be presented with icons associated with objects to be launched. According to another embodiment of the invention, menu bars associated with objects may be customized based on the usage pattern.

These and other objects, features, and advantages of the invention will be apparent through the detailed description of the embodiments and the drawings attached hereto. It is also to be understood that both the foregoing general description and the following detailed description are exemplary and not restrictive of the scope of the invention. Numerous other objects, features, and advantages of the invention should now become apparent upon a reading of the following detailed description when taken in conjunction with the accompanying drawings, a brief description of which is included below. Where applicable, same features will be identified with the same reference numbers throughout the various drawings.

DETAILED DESCRIPTION

Figure 1:
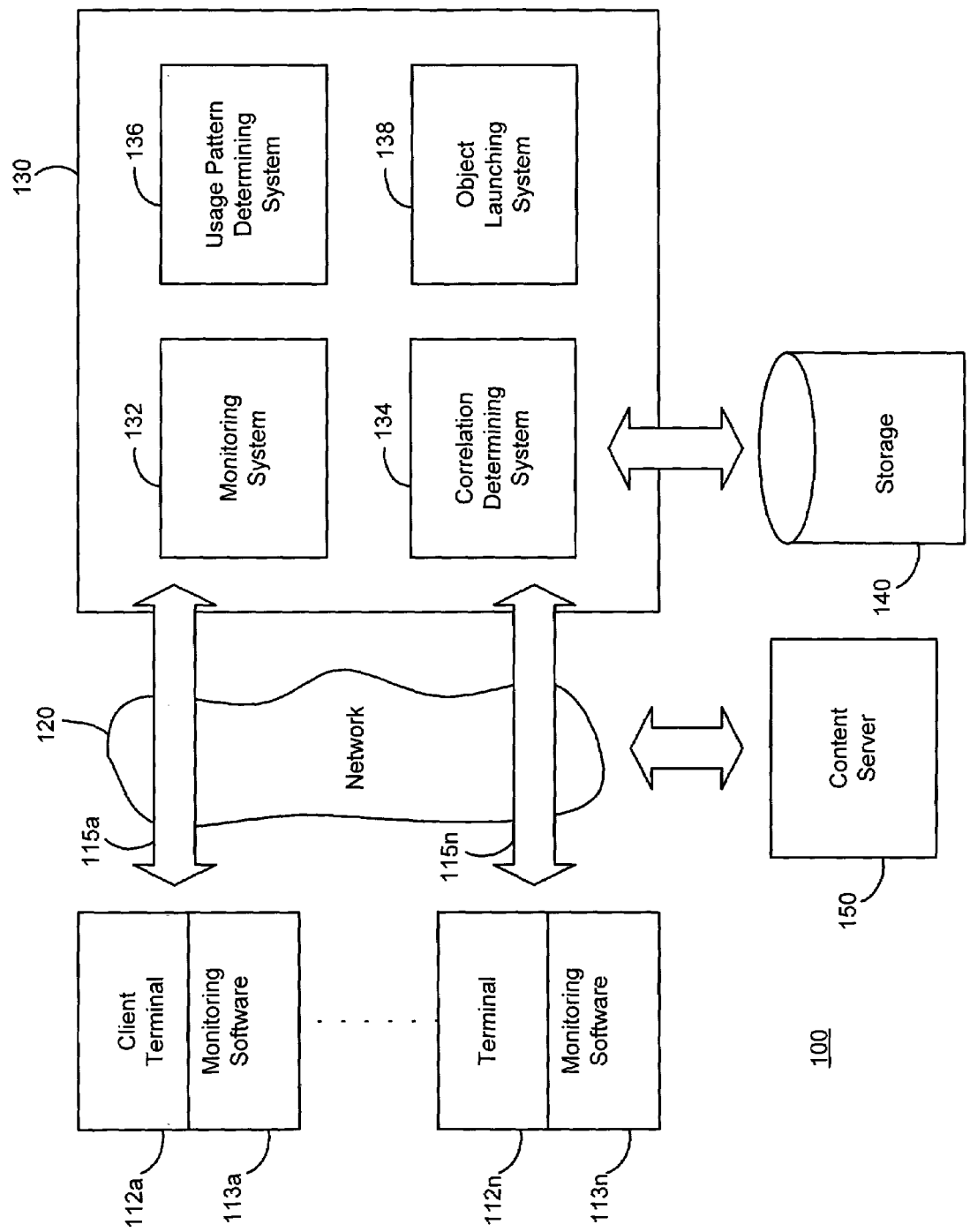
FIG. 1 illustrates an exemplary embodiment of a system diagram according to an embodiment of the invention.

FIG. 1 illustrates an example of the system architecture 100 according to one embodiment of the invention. Client terminals 112a–112n (hereinafter identified collectively as 112) and server(s) 130 may be connected via a wired network, a wireless network, a combination of the foregoing and/or other network(s) (for example the Internet) 120. The system of FIG. 1 is provided for illustrative purposes only and should not be considered a limitation of the invention. Other configurations may be used.

The client terminals 112 may include any number of terminal devices including, for example, personal computers, laptops, PDAs, cell phones, Web TV systems, devices that combine the functionality of one or more of the foregoing or other terminal devices, and various other client terminal devices capable of performing the functions specified herein. According to one embodiment of the invention, users may be assigned to one or more client terminals.

According to one embodiment of the invention, communications may be directed between one client terminal 112 and another client terminal 112 via network 120, such as the Internet. Client terminals 112 may communicate via communications media 115a–115n (hereinafter identified collectively as 115), such as, for example, any wired and/or wireless media. Communications between respective client terminals 112 may occur substantially in real-time if the client terminals 112 are operating online.

According to another embodiment of the invention, communications may be directed between client terminals 112 and content server(s) 150 via network 120, such as the Internet. Client terminals 112 may communicate via communications media 115, such as, for example, any wired and/or wireless media. Communications between client terminals 112 and the content server 150 may occur substantially in real-time if the devices are operating online. One of ordinary skill in the art will appreciate that communications may be conducted in various ways and among other devices.

Communications via network 120, such as the Internet, may be implemented using current and future language conventions and/or current and future communications protocols that are generally accepted and used for generating and/or transmitting messages over the network 120. Language conventions may include Hypertext Markup Language ("HTML"), extensible Markup Language ("XML") and other language conventions. Communications protocols may include, Hypertext Transfer Protocol ("HTTP"), TCP/IP, SSL/TLS, FTP, GOPHER, and/or other protocols.

According to one embodiment of the invention, client terminals 112 may include, or be modified to include, corresponding monitoring software 113a–113n (hereinafter identified collectively as 113) that may operate in the background to observe all types of actions performed on the corresponding client terminal 112. The types of actions performed on the corresponding client terminal 112 may be monitored for any applications accessed through the client terminal. The actions may be associated with objects, including applications, documents, files, email messages, chat sessions, web sites, address book entries, calendar entries or other objects. The objects may include information, such as personal information, user data, and/or other information. According to one embodiment of the invention, monitoring software 113 may include client-side monitoring software. According to another embodiment of the invention, monitoring software 113 may include server-side monitoring software, such as monitoring system 132 that resides on server 130. Agents may be placed on the client terminal 112 to communicate information between monitoring system 132 and the client terminal 112. One of ordinary skill in the art will appreciate that other configurations may be available for deploying the monitoring software 113.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events, including application level activity, user actions performed on objects, a user's activity focus, and/or other triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and/or other user initiated action information.

Regarding computer initiated actions, computers may directly or indirectly access several types of objects during the course of the computer session. According to one embodiment of the invention, computers may perform actions including activating a screen saver, initiating an auto save, automatically downloading information from a web site (such as an update file), and performing other computer initiated actions. According to one embodiment of the invention, computer initiated actions may be tracked using triggering events including, for example, launching of a screen saver, initiating an auto save, and/or other triggering events. The type of information that corresponds to computer initiated actions may include, for example, when objects are automatically opened and/or closed, when the screen saver is activated, when an auto save is activated, and/or other computer initiated action information.

According to one embodiment of the invention, the monitoring software 113 may operate undetected by the user. For example, the monitoring software 113 may be transparent to the user and may not appear in the windows task manager, in the registry, startup utilities, and/or other visible locations. In another embodiment of the invention, the monitoring software 113 may operate undetected by the user, but the results may be viewed on demand by users. In yet another embodiment of the invention, the monitoring software 113 may operate with user awareness. One of ordinary skill in the art will readily appreciate that other implementations may be used to monitor and/or view results associated with the observed actions.

According to another embodiment of the invention, the monitoring software 113 may gather information associated with the observed user initiated actions and/or computer initiated actions according to several techniques. In one embodiment of the invention, the information may be gathered using direct observation. For example, the information may be gathered by directly observing a window-based system for tracking information including, for example, tracking when windows appear and/or disappear from the graphical user interface, tracking which window on the GUI is focused, and/or other tracking information. In another embodiment of the invention, the information may be gathered by directly observing the windows-based system and mapping windows back to the associated applications, among other mapping information. In yet another embodiment of the invention, the information may be gathered by directly observing the windows-based system to monitor when the client terminal is actively being used or sitting idle, among other status information.

In an alternative embodiment of the invention, the monitoring software 113 may operate in a mode that gathers information associated with the observed user initiated actions and/or computer initiated actions by configuring other applications to broadcast action information. According to one exemplary embodiment of the invention, the monitoring software 113 may configure a browser application or other application to generate and send messages, such as a time-stamped message or other identifying messages, that inform the monitoring software 113 of the action being implemented by the browser such as, for example, "opening http://www.novell.com in window 12345," among other actions. One of ordinary skill in the art will readily appreciate that other techniques may be used to gather information associated with the observed user initiated actions and/or computer initiated actions.

According to one embodiment of the invention, information corresponding to user initiated actions and computer initiated actions may be processed in real-time or may be stored for subsequent processing. Storage 140, or other storage device, may be used to store the user initiated actions and computer initiated actions, among other data.

According to another embodiment of the invention, separate applications may be used to monitor and organize the gathered information. For example, a first application may be used to gather information according to one or more of the direct observation monitoring technique, the application configuration monitoring technique and other monitoring techniques. A second application may be used to organize the information associated with all of the observed types of actions including, for example, collating and chronologically organizing records of the observed actions, generating any user-defined listing of information corresponding to the observed actions, or applying any other organizing techniques. The separate applications may be embodied in the monitoring software 113, the monitoring system 132, or a combination thereof, among other configurations. One of ordinary skill in the art will readily appreciate that several configurations may be used to monitor and/or organize information associated with all of the observed types of actions.

According to another embodiment of the invention, a single application may be used to monitor and organize the gathered information. For example, a single application may include both an observer component that gathers information corresponding to actions that are performed on a computer and an information organizing component, among other components. For example, the single application may be configured to observe and organize user initiated actions associated with objects including, for example, opening/closing objects, switching between objects/windows, and other user initiated actions. The single application may also observe and organize computer initiated actions including, for example, creating new windows, activating a screen saver, initiating idle time, generating focus-level information, generating application-level information (i.e., opening an application and closing it), and/or other computer initiated actions. The single application may be embodied in the monitoring software 113, the monitoring system 132, or a combination thereof, among other configurations.

Figure 2:
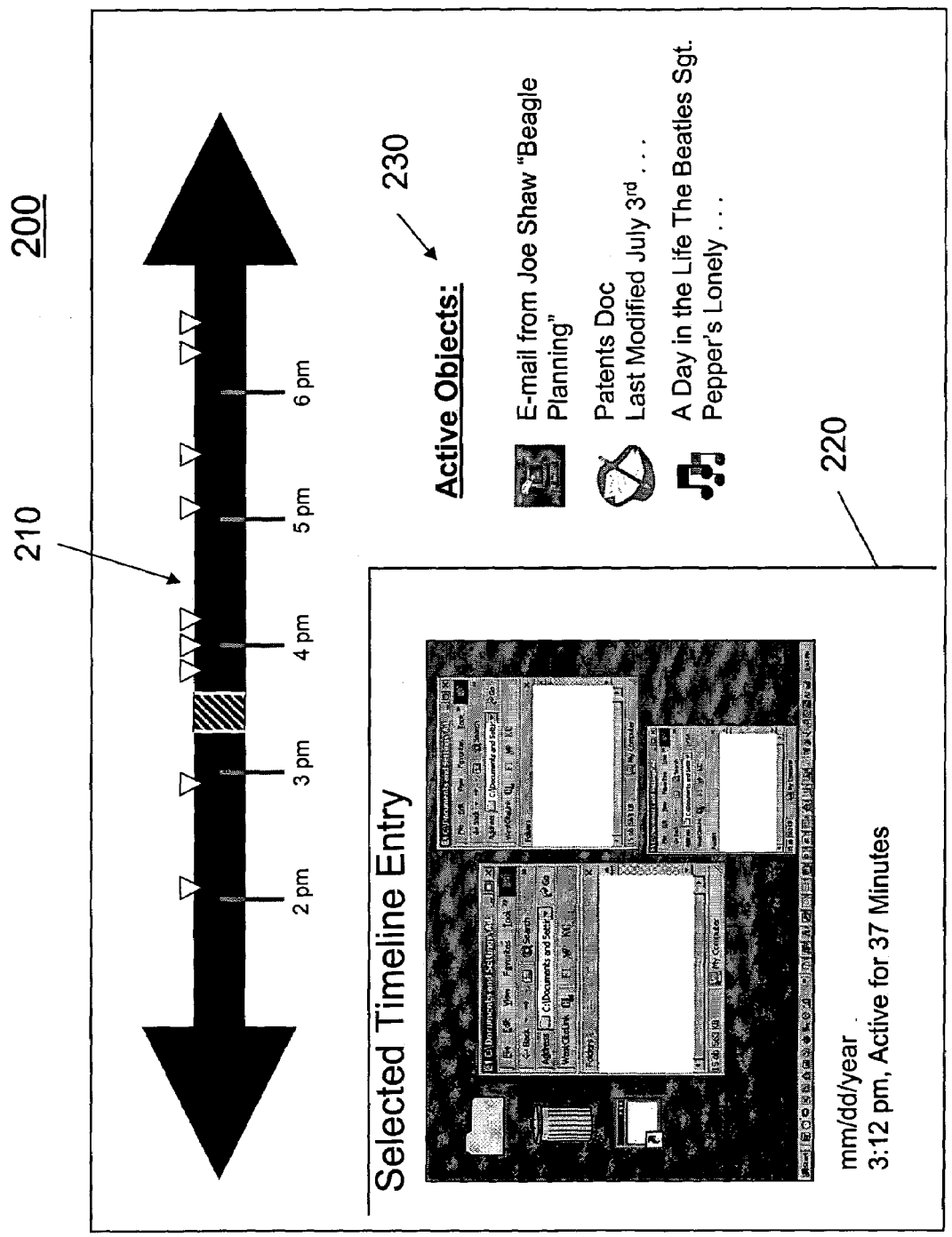
FIG. 2 illustrates an exemplary embodiment of a timeline according to one embodiment of the invention.

The information corresponding to user initiated actions and computer initiated actions may be displayed according to various configurations. As illustrated in FIG. 2, information corresponding to user initiated actions and computer initiated actions may be organized and displayed in a timeline 210. For example, timeline 210 may be arranged to include object entries that are organized in chronological time order. Display 200 may include a display portion 220 that illustrates the content of object entries, wherein the content may include information such as screenshots, dates that objects are accessed, times that objects are accessed, lengths of time that objects are active, and/or other information. Display 200 may also include a portion 230 that lists active objects. According to another embodiment of the invention, information corresponding to the user initiated actions and/or the computer initiated actions may be displayed in a non-linear format or other format. One of ordinary skill in the art will appreciate that various configurations may be provided for organizing and/or displaying the information corresponding to the user initiated actions and the computer initiated actions.

In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. Regarding the separate display of user initiated action information and computer initiated action information, a first timeline may be provided that displays user initiated actions according to a first user defined configuration. A second timeline may be provided that displays computer initiated actions according to a second user defined configuration. One of ordinary skill in the art will appreciate that various configurations may be provided for organizing and/or displaying the information corresponding to the user initiated actions and the computer initiated actions.

According to one embodiment of the invention, information corresponding to the user initiated actions and/or the computer initiated actions may be presented as graphical information through screenshots, charts, and/or other graphical information. Graphical information may be associated with objects and may be displayed with corresponding objects. The graphical information may be captured using triggering events associated with the user initiated actions and/or computer initiated actions, including application level changes, active window title bars changes, window focus changes, and/or other triggering events. In one exemplary embodiment of the invention, the graphical information may include a screenshot that captures GUI content as presented to the user.

According to one embodiment of the invention, users may be assigned to several client terminals 112. Thus, one or more monitoring applications 113 may be associated with users. According to another embodiment of the invention, a roaming monitoring application may be assigned to users that enables one monitoring application to operate on several client devices. The timeline associated with a selected user may include an aggregate timeline that organizes and displays information provided from one or more client terminals 112 that are associated with the selected user. Alternatively, several timelines may be associated with the selected user and may be separately displayed. One of ordinary skill in the art will readily appreciate that other techniques may be used to monitor and/or view results associated with one or more client terminals.

Figure 3:
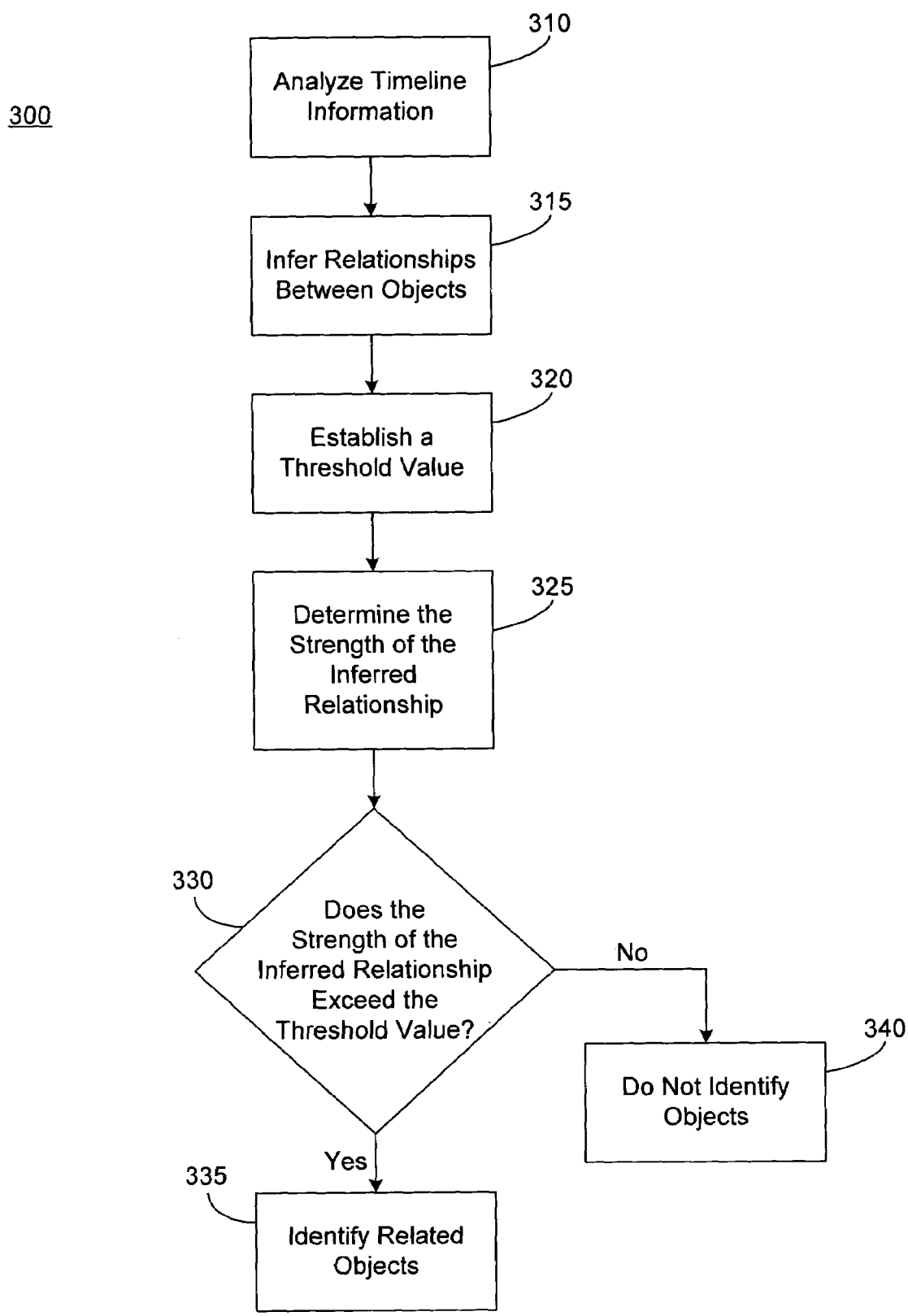
FIG. 3 illustrates a flow chart schematic for analyzing relationships between objects according to an embodiment of the invention.

According to another embodiment of the invention, information corresponding to user initiated actions and computer initiated actions may be analyzed by correlation determining system 134. FIG. 3 illustrates a flow diagram 300 of a generalized method for determining whether relationships exist between objects. In operation 310, timeline information is analyzed. For example, timeline information may be analyzed to discover that a first object (i.e., an email message) was opened, followed by the opening of a second object (i.e., a word processing application), followed by the opening and modification of a third object (i.e., a word processing document). According to another embodiment of the invention, correlation determining system 134 may analyze parameters derived from information associated with the user initiated actions relating to these objects including, for example, a temporal order in which the objects are accessed, focus toggling between the first object and the third object, opening the first object contemporaneously with the third object, and other user initiated actions, to infer relationships between objects. One of ordinary skill in the art will readily appreciate that other techniques may be used to infer relationships between objects.

In operation 315, relationships may be inferred between objects based on a chronological proximity of user initiated actions, a chronological proximity of window focus toggling, or other time-based information. Other types of information may be analyzed to infer relationships between objects. One of ordinary skill in the art will readily appreciate that relationships between objects may be inferred by analyzing one or more different parameters derived from common information that corresponds to user initiated actions and/or computer initiated actions.

According to an alternative embodiment of the invention, information corresponding to user initiated actions including, for example, a temporal proximity in which users access two or more objects, a temporal proximity in which users create two or more objects, a temporal proximity in which users edit two or more objects, operations that users conduct in close time proximity, or other information corresponding to user initiated action information, may be used to infer relationships between two or more objects. According to yet another embodiment of the invention, various known statistical methods may be used to infer relationships between two or more objects.

In operation 320, a threshold value may be established. Once relationships are discovered between two or more objects, the strength of the relationships may be determined in operation 325 using a relevance ranking that is based on a variety of factors associated with the user initiated actions and the computer initiated actions. According to one embodiment of the invention, the relevance may be provided with values determined from factors including, for example, a frequency of the user initiated actions, simultaneous/sequential occurrence of user initiated action, a duration of user initiated actions, overall chronological proximity of user initiated actions, and/or other factors. In operation 330, the strength of the relationships derived from the factors may be compared to the threshold value. In operation 335, a relationship between objects may be identified if the strength of the relationship is determined to exceed a predefined threshold value. Alternatively, in step 340, a relationship between objects may not be identified if the strength of the relationship is determined to be below a predefined threshold value. One of ordinary skill in the art will readily appreciate that other techniques may be used to determine the strength of relationships between objects.

According to one embodiment of the invention, correlation determining system 134 may analyze parameters derived from information associated with user initiated actions and/or computer initiated actions to discover relationships between objects. Thus, according to one embodiment of the invention, relationships may be discovered without considering content of the objects. In an alternative embodiment of the invention, a combination of content-searching and an analysis of parameters derived from information associated with user initiated actions and/or computer initiated actions may be used to discover relationships between objects. By contrast, in the example discussed above, known systems that only rely on content-based searching to discover relationships between objects would not identify that the first object (i.e., an email message) is related to the third object (i.e., a word processing document), if the first object and the third object include different content (e.g., terminology).

Figure 4:
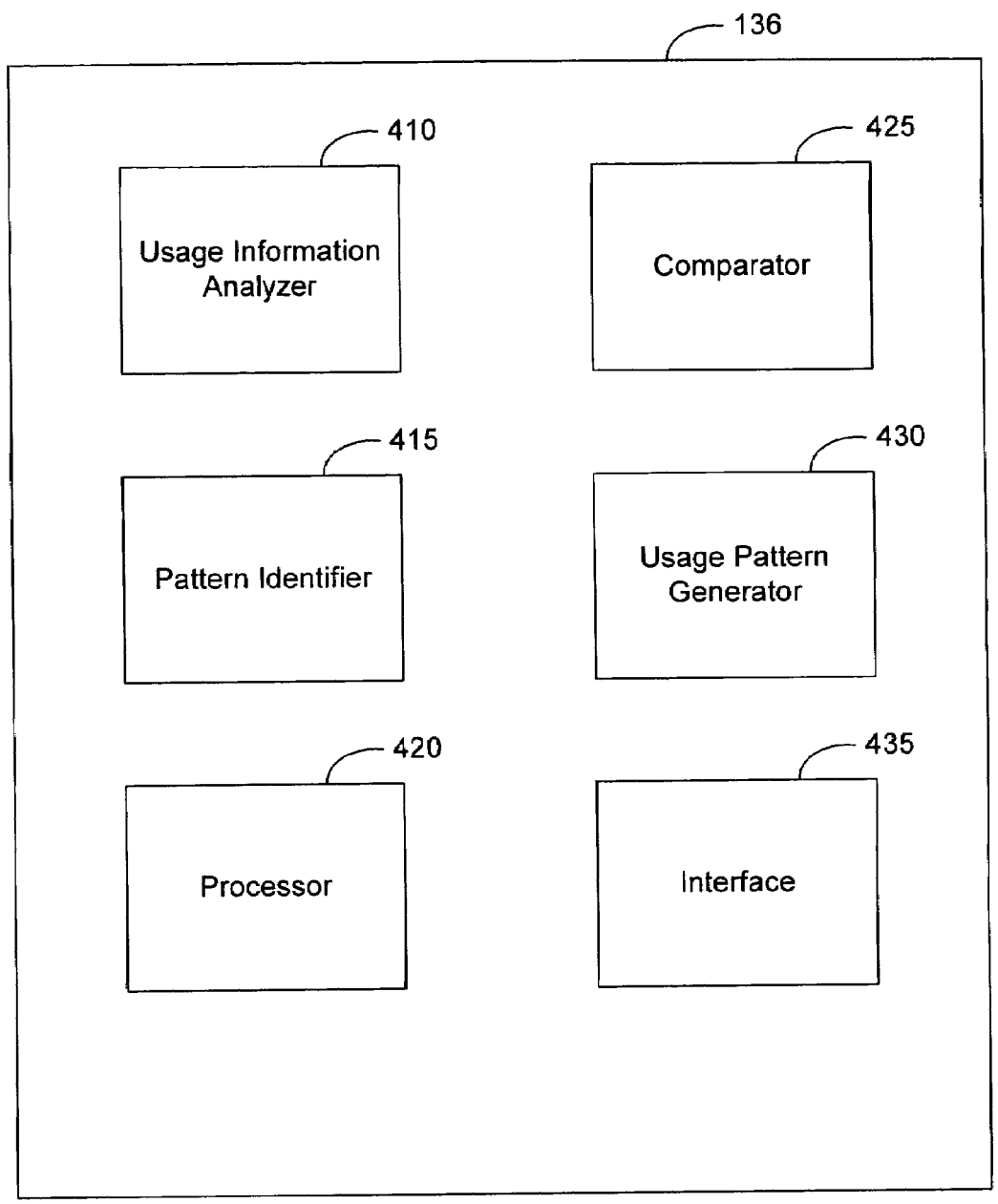
FIG. 4 illustrates an exemplary embodiment of a usage pattern determining device according to an embodiment of the invention.

According to another embodiment of the invention, information corresponding to user initiated actions and computer initiated actions may be analyzed by usage pattern determining system 136. As illustrated in FIG. 4, usage pattern determining system 136 includes usage information analyzer 410 that analyzes usage information associated with the objects, wherein the usage information includes user initiated action information or computer initiated action information. A pattern identifier 415 communicates with the usage information analyzer 410 and identifies patterns for objects based on the usage information. A processor 420 is provided to determine a number of times selected parameters in the usage information of objects recur over a predetermined period of time and to obtain a usage pattern threshold value. Information from the processor 420 is provided to comparator 425, which compares the usage pattern threshold value to the number of times selected parameters in the usage information of objects recur over the predetermined period of time. Based on the results of comparator 425, a usage pattern generator 430 may generate a usage pattern when the number of times that selected parameters in the usage information of objects recur over the predetermined period of time exceed the usage pattern threshold value. An interface 435 may be provided to display the usage pattern and enable the usage pattern to be adjusted. The interface may include a video monitor or other device that is capable of displaying information. While separate components are illustrated, one of ordinary skill in the art will readily appreciate that one or more components may be configured to perform these functions and that the functions may be performed using software or hardware components.

Figure 5:
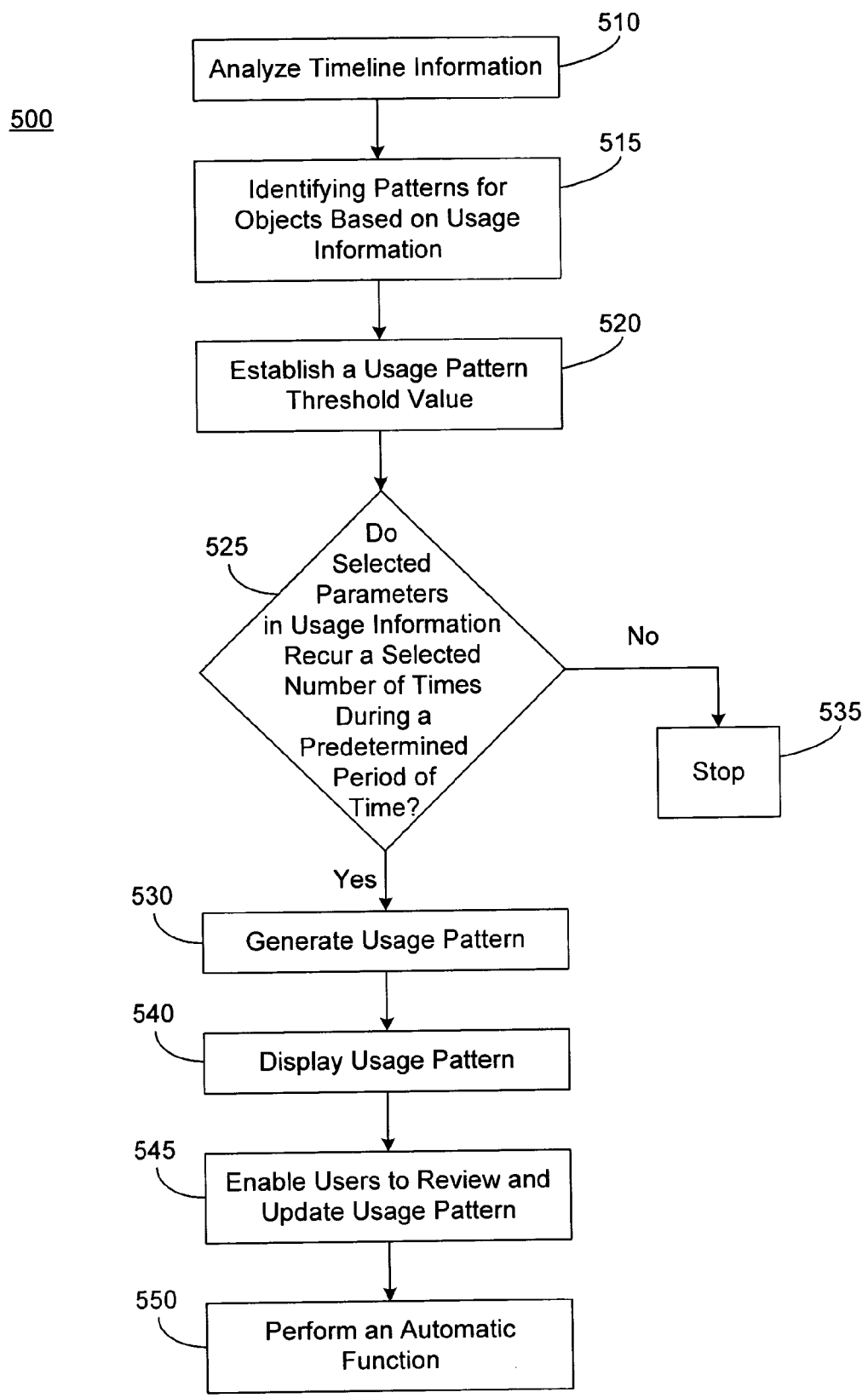
FIG. 5 illustrates a flow chart schematic for determining a usage pattern according to an embodiment of the invention.

FIG. 5 illustrates a flow diagram 500 for a generalized method of determining a usage pattern. In operation 510, information from the timeline is analyzed. In operation 515, patterns for objects may be identified based on usage information including, for example, a time of day actions are performed, locations (e.g., home, work, and other locations) that actions are performed, and/or other usage information. According to one embodiment of the invention, the location may be determined using an IP address of the client device 112 or other identifier.

According to one embodiment of the invention, the information that corresponds to user initiated actions and computer initiated actions may be organized in a timeline that provides a detailed history of all types of actions performed during the relevant computer session. The usage pattern determining system 136 may analyze the timeline information to discover that during a predetermined time period (e.g., days, hours, minutes, seconds, etc.), the user opened a first object (e.g., an email application) and a second object (e.g., a word processing application) multiple times during a first relative time. Additionally, the usage pattern determining system 136 may discover that during the predetermined time period, the user opened a third object (i.e., a web browser application) multiple times at a second relative time.

In operation 520, a usage pattern threshold value may be established. Once patterns for selected objects are identified, a comparison may be performed in operation 525 between the number of times selected parameters in the usage information, for the identified objects, recur over a predetermined period of time and the usage pattern threshold value. In operation 530, a usage pattern may be generated if the usage information recurs more than the usage pattern threshold value, as determined over a predetermined period of time. Alternatively, in operation 535, the inquiry may stop if the usage information does not recur more than the usage pattern threshold value, as determined over a predetermined period of time. One of ordinary skill in the art will readily appreciate that other techniques may be used to determine a usage pattern for objects.

By maintaining a detailed history in the timeline of user initiated actions and/or computer initiated actions, usage preferences may be discovered including, for example, whether users enter data upon receipt or whether users wait until a later time to enter the data, what time of day users engage in activities such as surfing the web, and/or other user preferences. According to another embodiment of the invention, usage pattern determining system 136 may analyze timeline information to predict relevant information including, for example, a location of the user, a preferred object to be launched during a selected time, and/or other relevant information. If a usage pattern is determined to exist during a particular time of day and/or for a location, then the usage pattern determining system 136 may perform an action on corresponding objects, based on the determined usage pattern.

In operation 540, the usage pattern may be displayed to the user. In operation 545, the user may review and/or modify the usage pattern. According to another embodiment of the invention, users may update the usage pattern by, for example, adding or removing actions performed on objects, adjusting relative times of use, and performing other usage pattern updating functions. According to another embodiment of the invention, the usage pattern may be updated at scheduled intervals to capture on-going user initiated actions and/or computer initiated actions.

According to one embodiment of the invention, an object launching system 138 may communicate with the usage pattern determining system 136 to obtain the usage pattern. Based on the usage pattern, an automatic function may be performed in operation 550. In one embodiment of the invention, the object launching system 138 may automatically launch the objects that coincide with the usage pattern. Alternatively, based on the usage pattern, the object launching system 138 may present users with icons associated with objects to be launched. According to one embodiment of the invention, the icons may be presented to users through the GUI, among other interfaces.

According to another embodiment of the invention, menu bars associated with objects may be customized based on the usage pattern. The menu bars may be customized according to a user profile, a client terminal profile, an object profile, or other profiles. Information corresponding to user-object interaction, such as a user's preferences for when two or more objects coexist on the GUI and other preferences, may provide valuable clues for automatically customizing objects. According to one embodiment of the invention, if the user accesses a first object through a second object, the system may automatically adjust preferences of the second object based on the first object. According to one embodiment of the invention, user-object interaction monitoring may be triggered when two or more objects interrelate, such as when a user launches a first object (e.g., a word processing application) and opens a second object (e.g., a word processing document) therein, among other user-object interactions. According to one embodiment of the invention, user-object interaction information may include, for example, that a user customizes a first object (e.g., the menu bars of a word processing application) based on selection of a second object (e.g., the type of word processing document selected); automatic implementation of GUI layout preferences (e.g., color schemes, icon arrangement, and other layout preferences) based on the object selected, and other user-object interaction information. One of ordinary skill in the art will readily appreciate that other automatic functions may be performed.

The foregoing presentation of the described embodiments is provided to enable any person skilled in the art to make or use the invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, as a firmware program loaded into non-volatile storage or a software program loaded from or into a data storage medium as machine-readable code, such code being instructions executable by an array of logic elements such as a microprocessor or other digital signal processing unit, or may include other implementations.

Embodiments of the invention include a computer program containing one or more sequences of machine-readable instructions describing a method as disclosed above, or a data storage medium (e.g. semiconductor memory, magnetic or optical disk) having such a computer program stored therein. The invention is not intended to be limited to the embodiments provided above, but rather is to be accorded the widest scope consistent with the principles and novel features disclosed in any fashion herein. The scope of the invention is to be determined solely by the appended claims.

What is claimed is:

1. A method of generating usage patterns to automatically perform functions associated with objects, comprising:
    analyzing usage information associated with the objects, wherein the usage information includes user initiated action information or computer initiated action information;
    identifying patterns for objects based on the usage information;
    determining a number of times selected parameters in the usage information of objects recur over a predetermined period of time, wherein the selected parameters recur in the usage information a plurality of times over the predetermined period of time;
    obtaining a usage pattern threshold value;
    comparing the usage pattern threshold value to the number of times selected parameters in the usage information of objects recur over the predetermined period of time;
    generating a usage pattern when the number of times selected parameters in the usage information of objects recur over the predetermined period of time exceed the usage pattern threshold value;
    presenting the usage pattern; and
    enabling the usage pattern to be adjusted.

2. The method according to claim 1, wherein the user initiated action information or the computer initiated action information are associated with corresponding user initiated actions or computer initiated actions and wherein the user initiated actions or the computer initiated actions are organized in a chronological timeline.

3. The method according to claim 2, wherein the usage information includes (i) a time of day the user initiated actions or the computer initiated actions are performed, (ii) locations where the user initiated actions or the computer initiated actions are performed, or a combination of (i) and (ii).

4. The method according to claim 1, wherein the predetermined period of time includes days, hours, minutes, or seconds.

5. The method according to claim 1, wherein the objects include (i) applications, (ii) documents, (iii) files, (iv) electronic mail messages, (v) chat sessions, (vi) web sites, (vii) address book entries, (viii) calendar entries or any combination of (i) to (viii).

6. The method according to claim 1, further comprising (i) automatically launching the objects according to the usage pattern, (ii) automatically presenting icons associated with the objects, (iii) automatically customizing menu bars associated with the objects, or any combination of (i) to (iii).

7. The method according to claim 6, wherein the menu bars are customized according to (i) a user profile, (ii) a client profile, (iii) an object profile, or any combination of (i) to (iii).

8. A system for generating usage patterns to automatically perform functions associated with objects, comprising:
    usage information analyzer that analyzes usage information associated with the objects, wherein the usage information includes user initiated action information or computer initiated action information;
    pattern identifier that identifies patterns for objects based on the usage information;
    a processor that determines a number of times selected parameters in the usage information of objects recur over a predetermined period of time and obtains a usage pattern threshold value, wherein the selected parameters recur in the usage information a plurality of times over the predetermined period of time;
    a comparator that compares the usage pattern threshold value to the number of times selected parameters in the usage information of objects recur over the predetermined period of time;
    usage pattern generator that generates a usage pattern when the number of times selected parameters in the usage information of objects recur over the predetermined period of time exceed the usage pattern threshold value; and
    an interface that displays the usage pattern and enables the usage pattern to be adjusted.

9. The system according to claim 8, wherein the user initiated action information or the computer initiated action information are associated with corresponding user initiated actions or computer initiated actions and wherein the user initiated actions or the computer initiated actions are organized in a chronological timeline.

10. The system according to claim 9, wherein the usage information includes (i) a time of day the user initiated actions or the computer initiated actions are performed, (ii) locations where the user initiated actions or the computer initiated actions are performed, or a combination of (i) and (ii).

11. The system according to claim 8, wherein the predetermined period of time includes days, hours, minutes, or seconds.

12. The system according to claim 8, wherein the objects include (i) applications, (ii) documents, (iii) files, (iv) electronic mail messages, (v) chat sessions, (vi) web sites, (vii) address book entries, (viii) calendar entries or any combination of (i) to (viii).

13. The system according to claim 8, further comprising an object launching system that (i) automatically launches the objects according to the usage pattern, (ii) automatically presents icons associated with the objects, (iii) automatically customizes menu bars associated with the objects, or any combination of (i) to (iii).

14. The system according to claim 13, wherein the menu bars are customized according to (i) a user profile, (ii) a client profile, (iii) an object profile, or any combination of (i) to (iii).

15. A method of inferring relationships between objects of a client terminal, comprising:
  analyzing information associated with the objects, wherein the information includes user initiated action information or computer initiated action information;
  inferring relationships between the objects based on the analyzed information;
  obtaining a threshold value;
  determining a strength of the inferred relationships based on a relevance ranking value that is associated with the inferred relationships;
  comparing the threshold value and relevance ranking value;
  identifying the inferred relationship when the relevance ranking value exceeds the threshold value; and
  performing a client terminal function in response to the identified inferred relationship.

16. The method according to claim 15, wherein the objects include (i) applications, (ii) documents, (iii) files, (iv) electronic mail messages, (v) chat sessions, (vi) web sites, (vii) address book entries, (viii) calendar entries or any combination of (i) to (viii).

17. The method according to claim 15, wherein the user initiated action information or the computer initiated action information are associated with corresponding user initiated actions or computer initiated actions and wherein the user initiated actions or the computer initiated actions are organized in a chronological timeline.

18. The method according to claim 15, wherein the information includes (i) a time of day the user initiated actions or the computer initiated actions are performed, (ii) locations where the user initiated actions or the computer initiated actions are performed, or a combination of (i) and (ii).

19. The method according to claim 15, wherein the strength of the inferred relationships is determined based on (i) a frequency of the user initiated actions, (ii) simultaneous occurrence of user initiated actions; (iii) sequential occurrence of user initiated actions, (iv) duration of user initiated actions, (v) overall chronological proximity of user initiated actions, or any combination of (i) to (v).

20. The method according to claim 15, wherein analyzing information associated with the objects includes content-based searching.

* * * * *